Aug. 20, 1940.                K. ABRAHAM                 2,212,109
                    DEVICE FOR OZONIZING REFRIGERATORS
                         Filed Jan. 12, 1938
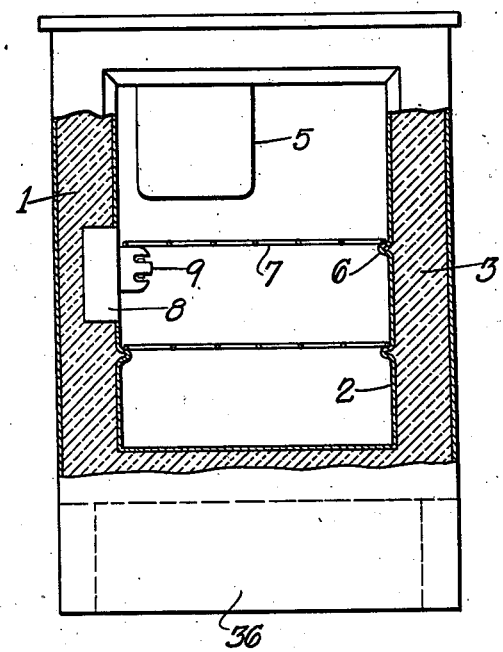
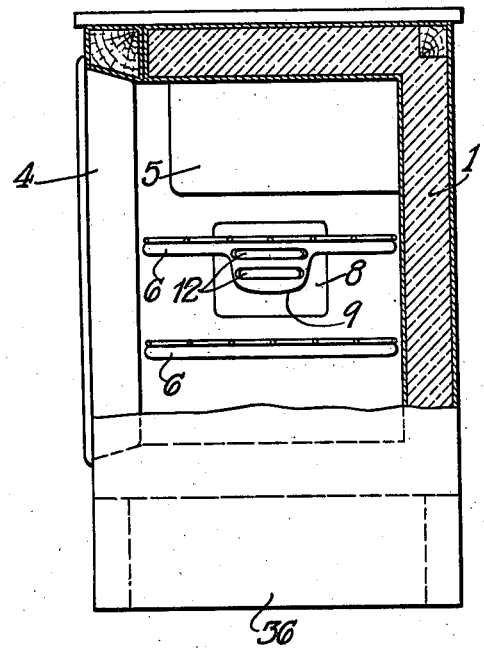
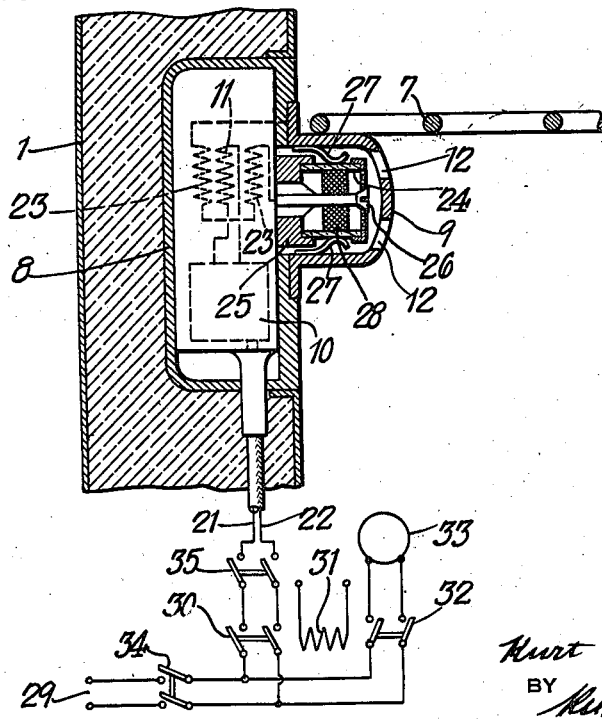
INVENTOR
Kurt Abraham
BY
his ATTORNEYS Patented Aug. 20, 1940

2,212,109

UNITED STATES PATENT OFFICE 2,212,109

DEVICE FOR OZONIZING REFRIGERATORS

Kurt Abraham, Brooklyn, N. Y., assignor to Siemens & Halske, Aktiengesellschaft, Berlin-Siemensstadt, Germany, a corporation of Germany Application January 12, 1938, Serial No. 184,520
In Germany December 22, 1937

6 Claims. (Cl. 62—89)

This invention relates to cabinet refrigerators, especially to such refrigerators of domestic and similar types.

It has been proposed to improve the food-preserving effects of refrigerators and to deodorize the air within the cooling chamber by circulating ozone through the cooling chamber.

An object of the invention is to simplify the structure and arrangement of ozone apparatus so as to render them applicable in combination with cabinet refrigerators in such a way that the ozone is developed immediately within the cabinet.

Another object of the invention consists in reducing the space occupied by that portion of the ozone-producing device which lies within the utilizable storage space of the cabinet, and in locating these parts in such a manner that the ozonizing elements avoid obstructing the storage space.

A still further object is an economic, current-saving operation of the ozone apparatus.

The invention will be understood by the following description of the embodiment illustrated in the accompanying drawing in which—

Figure 1 shows, partly in section, a refrigerator cabinet provided with an ozonizer unit according to the invention;

Figure 2 shows the same refrigerator in a view at right angles with respect to that of Figure 1, likewise partly in section;

Figure 3 represents a cross section through the ozone-producing apparatus shown in Figures 1 and 2, as well as a diagram of the operating circuit.

In the figures, 1 designates the outer wall of a domestic refrigerator and 2 the inner wall forming the cooling chamber. Both walls are made of sheet metal. 3 designates the thermically insulating material placed between the walls 1 and 2. 4 is the door of the cabinet and 5 the casing of the evaporator arranged near the top of the cooling chamber. The inner wall 2 of the chamber is provided with ledges 6 for carrying screens 7 forming storage shelves. The elements described so far correspond to those of conventional refrigerators and may be constructed and arranged in any known manner. The evaporator 5, for instance, may be that of an electrically or other energy operated refrigerating system of the compression or the absorption type.

Reference numeral 8 designates the casing of an ozone apparatus. The casing consists of insulating material and carries a projecting portion 9 of metal which is electrically grounded. Casing 8, however, may also be made of metal. The casing contains electric elements for generating the high frequency current necessary for producing ozone, and portion 9 encloses or forms part of an electrode set connected with the high frequency circuit. As shown in Figure 3, the two leads 21 and 22 of an alternating current circuit are connected to a high frequency generator 10. The output side of this generator is connected to the primary circuit 11 of a high frequency transformer, the secondary winding of which is designated by 23.

The projecting extension 9 of the ozonizer casing is constructed as a removable cover. It forms one of the active electrodes. A cylinder 24 of glass or another insulating material is placed upon an insulating base 25 and held in position by a screw or bolt 26 and by leaf springs 27 mounted to the cover electrode 9. Cylinder 24 carries at its inside a wire gauze electrode 28 which is connected to the second pole of the high frequency transformer by means of bolt 9 and a conductive connection (not shown) between bolt 9 and gauze 28.

Preferably, the ozone-producing secondary circuit including the electrodes 9 and 28 and the secondary windings 23 of the high frequency transformer are tuned to the primary high frequency circuit. This tuning may be effected by employing an adjustable high frequency transformer, by applying adjustable reactors or other means common for tuning high frequency circuits. If, for instance, the transformer is supplied with comminuted high frequency magnet cores, a sufficient tuning of adequate permanence may be effected by providing the magnet cores with an adjusting screw as known with high frequency iron cores for radio purposes. The arrangement shown in Figure 3 is adapted to be tuned by the manufacturer or adjuster so as to require no further attention when using the refrigerator. However, it could also be provided with tuning means which are arranged accessibly in order to facilitate repairs and subsequent adjustments.

The casing 8 is so arranged between walls 1 and 2 that only the extension 9 projects into the cooling chamber. Part 9 is provided with apertures 12 so as to allow the air of the cooling chamber to reach the electrodes.

In order to avoid space-obstruction, part 9 is arranged immediately below one of the shelf screens 7. In the embodiment shown, one of the screen-carrying ledges 6 is structurally combined with cover part 9. Casing 8 may also be arranged at the top or in a corner of the cooling chamber. It is further of advantage in some cases to render casing 8 directly accessible from the outside of the cabinet in order to facilitate the mounting of the ozonizer and an exchange or adjustment of its elements.

The operation of the ozonizing device is the following: So long as the current energizing the high frequency generator 10 is switched in, air within the cooling chamber passing through the apertures 12 is decomposed and ozone is developed. This ozone produces an additional preserving effect, thus improving the storageability of sensitive products and also largely prevents the development of unpleasant odors.

While the ozonizer could be dimensioned for being permanently operated as long as the refrigerator itself is in operation, it is, according to the invention, of advantage to provide a device for periodically operating the ozone apparatus in dependency on the actual want or on operating conditions which are in conformity with the ozone consumption in an approximation sufficient for practical purposes. The arrangement illustrated by Figure 3 corresponds to the last-mentioned type of apparatus.

The leads 21 and 22 are connected to an alternating current supply circuit 29 through a switch 35 and a contact device 30. Contacts 30 form part of a control relay, the magnet coil of which is designated by 31. A second contact set 32 of this relay is also connected with the supply circuit 29 and serves to control the electric motor 33 of the refrigerating system which includes evaporator 5. A main switch 34 serves to connect or disconnect the whole refrigerator unit, including the ozone apparatus, with the supply circuit, while switch 35 allows disconnecting of the ozonizer without affecting the refrigeration. Coil 31 of the control relay is connected with a thermostat which causes the coil to be energized in response to a given or adjusted maximum temperature in the cooling chamber. The electrical system shown in the lower part of Figure 3 is arranged in the base section 36 of the cabinet below the cooling chamber.

In the arrangement shown in Figure 3, the ozonizer is periodically switched in simultaneously with the refrigerating system and operates as long as the motor of that system is running. The electrode portion of the ozonizer is so dimensioned that during each operating period, ozone is produced in a sufficient excess. This dependency of the ozone production upon the operation of the refrigerating system presents the advantage that indirectly by very simple means a dependency of the ozone production upon the openings of the cabinet door and thereby upon the actual need of ozone is obtained. If, namely, the door is opened and thus a loss of ozone is caused or new foods to be cooled and preserved are stored, the temperature within the chamber increases and effects a switching-in of the motor as well as of the ozone apparatus. Although the ozone consumption theoretically is not in strict correspondence with the required cooling, the results obtained with the above-described arrangement are satisfactory for many practical, especially domestic, purposes and present the advantages of simplicity and reliability.

The relay coil 31 may be provided with only one set of contacts, serving to control the ozonizer only. The relay may further be operated by a time switch which effects a switching-in of the ozone apparatus for a given period after each opening of door 4. A door contact, as conventional for lighting refrigerator cabinets, may be employed for operating the time switch. Coil 31 may also be connected with a control element which causes an energization of the coil in dependency upon the ozone content within the cooling chamber.

While the embodiment illustrated shows the high frequency generator 10 in structural combination with the electrodes 9, both portions of the apparatus may be mounted separately. For instance, a second set of electrodes arranged in another section of the cabinet may be connected with the high frequency generator or the high frequency transformer of another electrode set. The high frequency generating portion may also be placed in the bottom or base part 36 of the cabinet while one or more electrode sets connected to the generator are arranged in other places of the cooling chamber.

I claim:

1. With a cabinet refrigerator, in combination, an ozone-producing apparatus comprising a casing mounted within the insulating wall of the cabinet of said refrigerator, an electric high frequency generating system arranged in said casing, an electrode set electrically connected with said system, and a perforated enclosure forming part of said electrode set and being secured to said casing so as to project into the cooling chamber of said cabinet.

2. With a cabinet refrigerator having its cooling chamber designed to be provided with shelves, in combination, an ozone-producing apparatus comprising a casing mounted within the insulating wall of the cabinet of said refrigerator, an electric high frequency generating system arranged in said casing, an electrode set electrically connected with said system, and a perforated enclosure forming part of said electrode set and being secured to said casing so as to project into the cooling chamber of said cabinet, said enclosure being arranged in the top portion of one of the horizontal chamber-sections formed by said shelves.

3. With a cabinet refrigerator having its cooling chamber provided with screen-like shelves, in combination, an ozone-producing apparatus comprising a casing mounted within the insulating wall of the cabinet of said refrigerator, an electric high frequency generating system arranged in said casing, a perforated metallic cover secured to said casing and connected with one pole of said system, an electrode arranged within said cover and connected with the other pole of said system, said cover being arranged so as to project into said chamber and forming a support for one of said shelves.

4. With a cabinet refrigerator having a cooling chamber, in combination, an electric apparatus for producing ozone united with the cabinet of said refrigerator so as to form a structural unit, the electrodes of said apparatus being arranged in said cooling chamber for directly influencing the air in said chamber and an automatic control device connected with said apparatus and designed for periodically operating said apparatus.

5. With a cabinet refrigerator having a cooling chamber enclosed by heat insulating walls, in combination, an ozone-producing apparatus comprising a high frequency generating portion and a set of ozone-producing electrodes connected with said generator portion, said set of electrodes being arranged within said cooling chamber, said generator portion being arranged within a heat insulating wall of said cooling chamber.

6. With a cabinet refrigerator having a cooling chamber enclosed by heat insulating walls, in combination, an ozone-producing apparatus comprising a casing, an electric high frequency generating system arranged in said casing, an electrode set electrically connected with said system, a perforated protecting enclosure forming part of said electrode set, said casing being mounted within a heat insulating wall of said cooling chamber, and said enclosure being mounted on said wall so as to project into said cooling chamber.

KURT ABRAHAM.